Feb. 16, 1954 W. A. RAY 2,669,417
BALANCED SLIDE VALVE FOR HIGH HYDRAULIC PRESSURES
Filed June 29, 1950 2 Sheets-Sheet 1

WILLIAM A. RAY,
INVENTOR.

BY John Flam
ATTORNEY

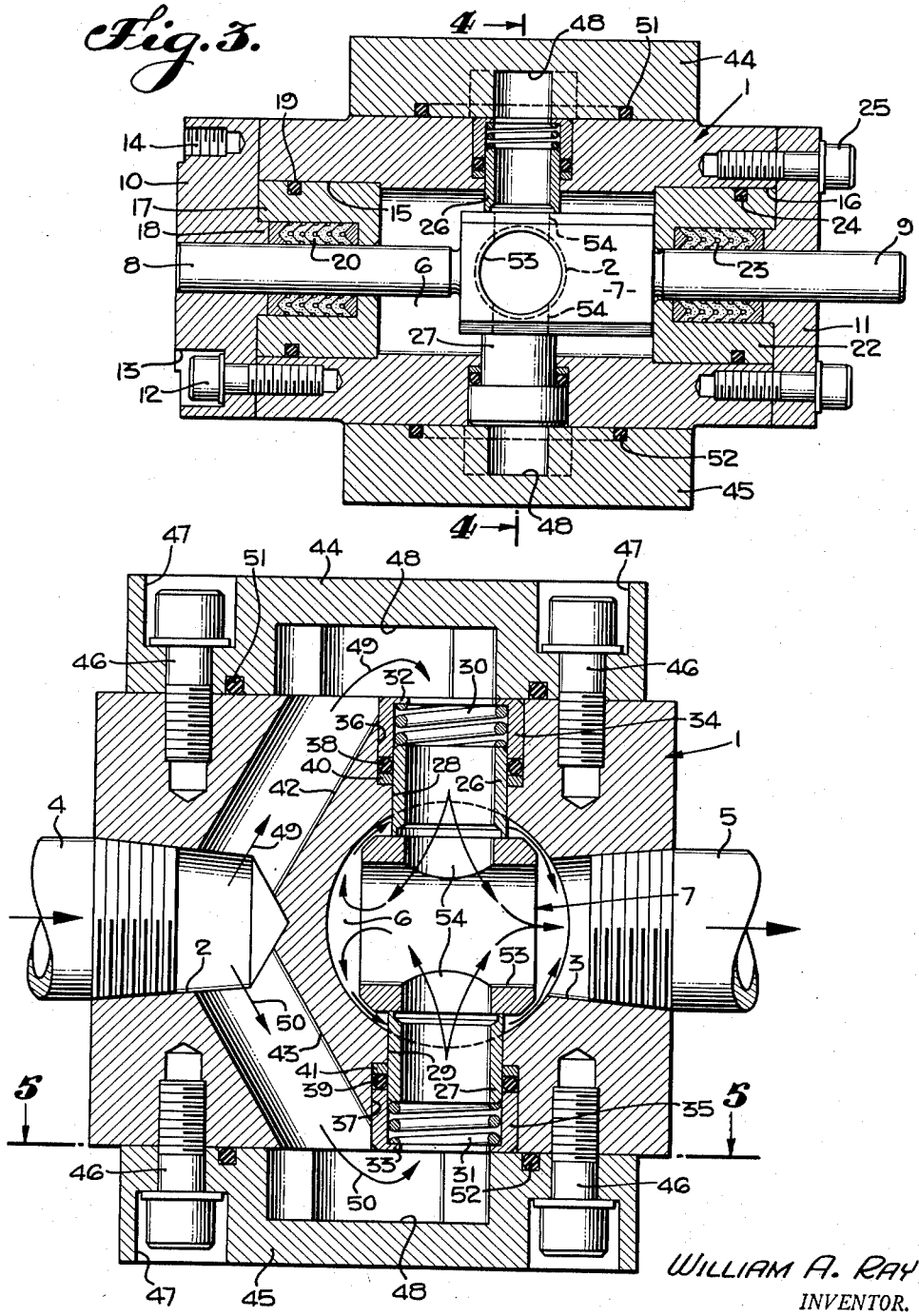

Patented Feb. 16, 1954

2,669,417

UNITED STATES PATENT OFFICE 2,669,417

BALANCED SLIDE VALVE FOR HIGH HYDRAULIC PRESSURES

William A. Ray, North Hollywood, Calif., assignor to General Controls Co., a corporation of California Application June 29, 1950, Serial No. 171,071

10 Claims. (Cl. 251—78)

This invention relates to slide valves, and particularly to valves that are used in hydraulic control systems.

For example, such valves are extensively used in aircraft for remote control of operating parts of the craft. The fluid utilized is usually oil, and at a pressure of the order of 3000 to 5000 pounds per square inch.

When the slide closure is in closed position, covering the inlet and the outlet, the pressure acting on the slide is quite high and, accordingly, a relatively large force is required to crack the valve. To overcome this effect, it has been necessary to provide bulky and inefficient structures.

It is one of the objects of this invention to provide a balanced valve of this character that is simple and compact.

It is still another object of this invention to improve, in general, slide valves for controlling liquids at high pressures.

This invention possesses many other advantages, and has other objects which may be made more clearly apparent from a consideration of one embodiment of the invention. For this purpose, there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings:

Fig. 3 is a view, similar to Fig. 2, illustrating the valve in open position;

Fig. 4 is an enlarged sectional view, taken along a plane corresponding to line 4—4 of Fig. 3.

Figure 1:
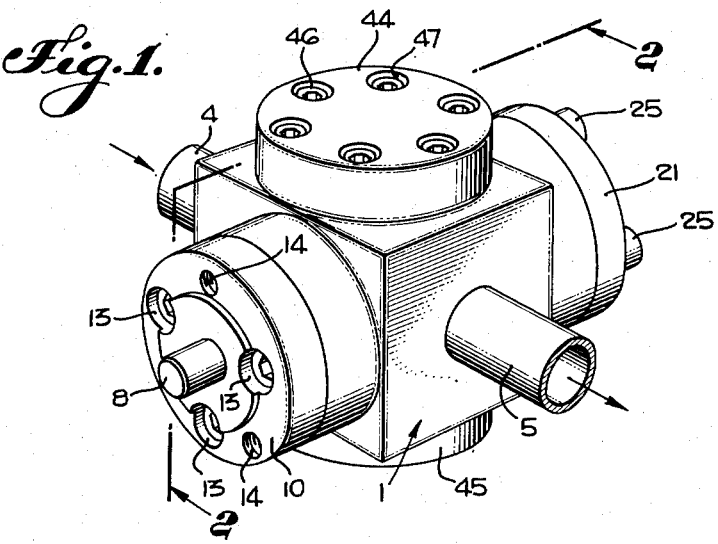
Figure 1 is a pictorial view of a slide valve incorporating the invention.

The valve body 1 is provided with the inlet opening 2 and an outlet opening 3 (Fig. 4). This valve body may be of generally rectangular configuration, terminating in cylindrical bosses at each end. Threaded into the openings 2 and 3 are the inlet conduit 4 and the outlet conduit 5. The outlet conduit 5 communicates with a chamber 6 formed in the body 1.

Flow from the inlet passage 2 to the outlet passage 3 is controlled by a slide structure 7 that has a generally rectangular cross section, as shown most clearly in Fig. 4. This slide 7 has substantial clearance with respect to the wall of the chamber 6. It is provided at its extremities with the guide stems 8 and 9 extending from opposite ends of the slide 7. These guide stems 8 and 9 may be of cylindrical cross section. They are guided in the heads 10 and 11. Head 10 is fastened to the left-hand side of the body 1, as by the aid of a plurality of cap screws 12. The heads of these screws are located in the counterbores 13 formed in the head 10. In this way, the left-hand surface of the head 10 may be appropriately fastened to a support, as by the aid of screws engaging the threaded apertures 14, angularly spaced from the counterbores 13.

The chamber 6 is formed by a through cylindrical bore transverse to the outlet opening 3 and terminating in enlarged bores 15 and 16. In the enlarged bore 15 a stuffing box member 17 is provided, telescoping over the inwardly directed projection 18 of the head 10. An O-ring gasket 19 is located in a groove in this stuffing box member 17. Packing material, such as a series of chevron packing rings 20, surrounds the stem 8, and is located in the space defined between the head 10 and the inner flange of the member 17.

A similar stuffing box structure is provided for the stem 9, including the head 21, stuffing box member 22, chevrons 23, and gasket 24. The head 21 may be attached, as by the cap screws 25, to the right-hand end of the body 1.

At opposite sides of the chamber 6, and communicating therewith, two hollow members 26 and 27 are provided. These are of cylindrical configuration, slidable within the bores 28 and 29 in the body 1. These bores 28 and 29 intersect the chamber 6. The inner ends of these members 26 and 27 are in slidable engagement with the upper and lower surface of the slide 7. They are urged against the slide 7 by the aid of the compression springs 30 and 31. These compression springs have their inner ends in contact with the outer ends of the slidable port-forming members 26 and 27. Their outer ends engage the flange 32, 33 of a retainer cup 34, 35. These retainers are inserted within the enlarged bores 36 and 37 communicating with the bores 28 and 29. A packing ring 38, of O-ring configuration, is disposed around the member 26, and a corresponding ring 39 is disposed around the member 27. These rings are held in place by the inner edges of the members 34 and 35, holding the rings 38 and 39 against washers 40 and 41. Washer 40 is disposed on the shoulder formed between bores 28 and 36, and the washer 41 is disposed on the shoulder formed between the bores 29 and 37.

The hollow interior of the members 26 and 27 is in communication with the inlet opening 2. This is accomplished by the aid of the oblique passages 42 and 43 communicating with the inlet opening 2 and opening in the upper and lower faces of the body member 1. In order to complete these passages to the interior of the members 26 and 27, caps 44 and 45 are fastened in a fluid-tight manner to the body 1. For this purpose, the cap screws 46 are utilized, the heads of the screws being located in counterbore 47. The caps 44 and 45 effectively restrain the retainers 34 and 35 from moving outwardly with respect to the body 1.

Figure 5:
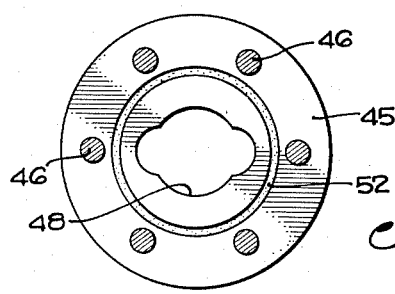
Fig. 5 is a sectional view taken along a plane corresponding to line 5—5 of Fig. 4.

Each of the caps 44 and 45 includes a recess 48 that serves to establish communication between passages 42, 43 with the hollow members 26 and 27, as indicated by the arrows 49 and 50. The configuration of the recess 48 is shown to best advantage in Fig. 5. In order to provide a fluid-tight connection, O-rings 51 and 52 are disposed in grooves located, respectively, in the inner faces of the caps 44 and 45.

The slide member 7 is provided with a port 53 that extends completely through the slide 7, and that is capable of being aligned with the outlet passage 3. Intersecting this port 53 is a transverse port 54. This port extends entirely through the slide 7, and cooperates with the port-forming members 26 and 27. In this position of Fig. 4, the port 54 is in alignment with the ports formed by the members 26 and 27 and, accordingly, the valve is in open position. In this position, inlet pressure is effective within the chamber 6 on substantially the entire surface of the slide 7; and it is also effective, through the ports 53 and 54, on the interior surfaces of these ports. The pressures on the slide 7 are, therefore, balanced.

Furthermore, since there are two passages formed by port 54 into the port 53, this port 54 need have a diameter of seven-tenths of that of port 53 to provide the same combined area of flow as the port 53.

Figure 2:
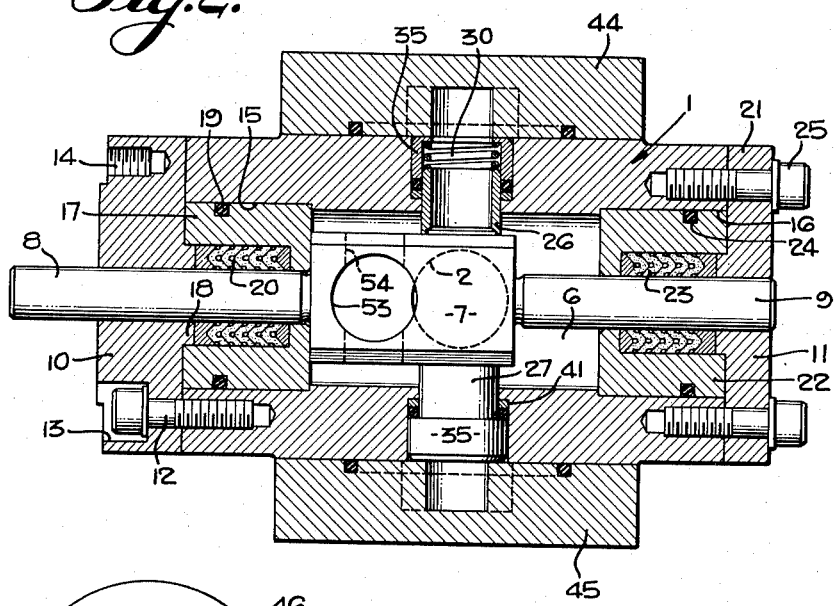
Fig. 2 is a sectional view, taken along a plane corresponding to line 2—2 of Fig. 1, and the valve being in closed position.

In order to close the valve, the stems 8 and 9 are moved to the left to assume the position of Fig. 2. In this position, the port 44 is out of registry with the port members 26 and 27, and the valve is closed.

In the closed position of Fig. 2, inlet pressure is effective on both the upper and lower surfaces of the slide 7 through the members 26 and 27. Accordingly, there is no unbalanced pressure. Furthermore, as soon as the slide 7 is moved to the open position of Figs. 3 and 4, the inlet pressure is effective over substantially the entire surface of the slide 7, again maintaining it in a balanced condition.

The members 26 and 27 are maintained in fluid-tight relation with respect to the slide 7 by the aid of the springs 30 and 31.

The inventor claims:

1. In a slide valve structure: a body having an inlet opening and an outlet opening, as well as a chamber transverse to the outlet opening; and a slide in said chamber movable in said chamber in a direction transverse to the outlet opening, and having a first transverse port communicating at all times with the chamber, as well as a second transverse port intersecting the first transverse port and opening on opposite sides of the slide; said slide having radial clearance with respect to the chamber; the body having means forming a pair of passages, both extending from the inlet opening and into the chamber, said means contacting opposite sides of the slide, said slide serving to cover said passage openings when the slide is in closing position.

2. In a slide valve structure: a body having a pair of openings, and a chamber communicating with one of said openings; and a slide in said chamber movable in said chamber in a direction transverse to the outlet opening, and having a first transverse port adapted to be aligned with said one opening, as well as a second transverse port intersecting the first port, and opening on opposite sides of the slide; said slide having radial clearance with respect to the chamber; the body having means forming a pair of passages, both extending from the other opening and into the chamber respectively and in engagement and said opposite sides of the slide, said second transverse port being registerable with said pair of passages, said slide serving to cover the passage openings when the slide is in closing position.

3. In a slide valve structure: a body having an inlet opening and an outlet opening, as well as a chamber transverse to the outlet opening; a slide in said chamber movable in said chamber in a direction transverse to the outlet opening, and having a first transverse port adapted to be aligned with the outlet opening, and communicating at all times with said chamber, as well as a second transverse port intersecting the first port; said slide having radial clearance with respect to the chamber; and means in sliding contact with those sides of the slide in which the transverse port opens, and forming inlet ports communicating with the said transverse port when the slide is in one position; said body having passages communicating with said means.

4. In a slide valve structure: a body having an inlet opening and an outlet opening, as well as a chamber transverse to the outlet opening; a slide in said chamber movable in said chamber in a direction transverse to the outlet opening, and having a first transverse port adapted to be aligned with the outlet opening, and communicating at all times with said chamber, as well as a second transverse port intersecting the first port; said slide having radial clearance with respect to the chamber; means in sliding contact with those sides of the slide in which the transverse port opens, and forming inlet ports communicating with the said transverse port when the slide is in one position; said body having passages communicating with said means; and means resiliently urging both said port-forming means against the slide.

5. In a slide valve structure: a body having an outlet passage and a chamber in communication with the outlet passage; a slide in the chamber; means guiding said slide for longitudinal movement in a direction transverse to said outlet passage; said slide having a radial clearance with respect to the walls of said chamber; said slide having a first through transverse port opening on opposite sides of said slide, said slide having a second through transverse port opening on other opposite sides of said slide and in communication with said first transverse port; and a pair of means extending into said chamber and forming a pair of inlet passages, said passage forming means being in engagement with said other opposite sides of said slide respectively; said inlet passages being in communication with said second transverse port upon movement of said slide to one position to substantially align said first transverse port with said outlet passage, said slide covering said inlet passages when the slide is moved from said one position.

6. In a slide valve structure: a body having an outlet passage and a chamber in communication with said outlet passage; a pair of tubular inlet port forming members having ends projecting into said chamber from opposite sides thereof, said port forming members being aligned, the axis of alignment of said members being perpendicular to said outlet passage; a slide in the chamber extending between the ends of said members; and means guiding said slide for longitudinal movement in a direction normal to said axis of alignment of said members and normal to said outlet passage; said slide having radial clearance with respect to the walls of said chamber; said slide having opposite parallel sides in engagement with the ends of said members; said slide having one through port that is aligned with said outlet passage upon movement of said slide to one position; said slide having another through port opening in said opposite parallel sides of said slide and intersecting said one through port, said other through port being aligned with said members and in communication therewith when said slide is in said one position; said slide covering said ends of said members upon movement of said slide from said one position.

7. In a slide valve structure: a body having an outlet passage and a chamber in communication with said outlet passage; a slide in the chamber; means guiding said slide for longitudinal movement in a direction normal to said outlet passage, said slide having radial clearance with respect to the walls of said chamber; said slide having opposite parallel side surfaces; a pair of tubular inlet port forming members having ends extending into said chamber and in engagement with said opposite parallel side surfaces of said slide; said body having means forming apertures guiding said members for movement toward and away from said slide; said members being axially aligned, the axis of alignment of said members extending perpendicular to said outlet passages; and means resiliently urging said members into engagement with said parallel side surfaces of said slide; said slide having a first through port that is aligned with said outlet passage upon movement of said slide to one position; said slide having a second through port opening in said parallel sides respectively and intersecting said first through port, said second through port being aligned with said members and in communication therewith when said slide is in said one position; said parallel side surfaces of said slide covering said ends of said members upon movement of said slide from said one position.

8. In a valve structure: a valve body having an inlet passage and an outlet passage, as well as a chamber in communication with said outlet passage, said inlet passage extending transversely of the body and opening at opposite ends exteriorly thereof; said valve body also having an aperture opening at opposite ends respectively in said chamber and an exterior surface of said body; a movable port forming member guidingly received in said aperture and extending into said chamber, said member being insertible from said exterior surface of said body; means resiliently urging said member into said chamber; and a cover member secured to said body and extending over one end of said inlet passage and said aperture respectively, said cover member having a recess interconnecting the inlet passage and said aperture.

9. In a valve structure: a valve body having an outlet passage and an interior chamber in communication with the outlet passage; said valve body having a pair of inlet passages extending respectively between an inlet port and opposite exterior surfaces of said valve body; means forming a pair of apertures extending respectively between said chamber and said exterior surfaces; a movable port forming member for each aperture and guidingly received therein, said members extending into said chamber and being insertible from said exterior surfaces of said body respectively; means resiliently urging said members into said chamber; and a pair of cover members detachably secured to said body at said exterior surfaces respectively, each of said cover members having means forming a chamber for establishing communication between its corresponding aperture and inlet passage end.

10. In a valve structure: a valve body having an outlet passage and a chamber in communication with said outlet passage, said valve body having an inlet passage extending transversely of said body and opening at one end in an exterior surface of said body, the other end of said inlet passage being connectible with an inlet conduit; said body also having an aperture opening at opposite ends in said exterior surface and said chamber respectively; a slide in said chamber; a movable port forming member insertible from said exterior surface into said aperture, said port forming member being guidingly received by said aperture and extending into said chamber and in engagement with said slide; resilient means engaging an end of said port forming member; and a cover plate detachably secured to said body and forming a chamber extending between said one end of said inlet passage and said aperture, said cover plate limiting outward movement of said resilient means.

WILLIAM A. RAY.

References Cited in the file of this patent

UNITED STATES PATENTS

| Number | Name | Date |
|---|---|---|
| 60,378 | Hunt | Dec. 11, 1866 |
| 486,747 | Wilkinson | Nov. 22, 1892 |
| 817,153 | Barr | Apr. 10, 1906 |
| 910,163 | Benninghoff | Jan. 19, 1909 |
| 930,860 | Horridge | Aug. 10, 1909 |
| 1,507,280 | Gomand | Sept. 2, 1924 |
| 2,291,563 | Rotter | July 28, 1942 |

FOREIGN PATENTS

| Number | Country | Date |
|---|---|---|
| 2,231 | Great Britain | of 1877 |